Feb. 21, 1950 H. A. HOWELL 2,498,423

MEANS FOR DEMAGNETIZING HIGH COERCIVE FORCE MATERIALS

Filed April 17, 1947

Inventor
HUGH A. HOWELL.

by The Firm of Charles W. Hills Attys.

Patented Feb. 21, 1950 2,498,423

UNITED STATES PATENT OFFICE 2,498,423

MEANS FOR DEMAGNETIZING HIGH COERCIVE FORCE MATERIALS

Hugh A. Howell, Valparaiso, Ind., assignor to The Indiana Steel Products Company, Chicago, Ill., a corporation of Indiana Application April 17, 1947, Serial No. 742,143

6 Claims. (Cl. 179—100.2)

Figure 1:
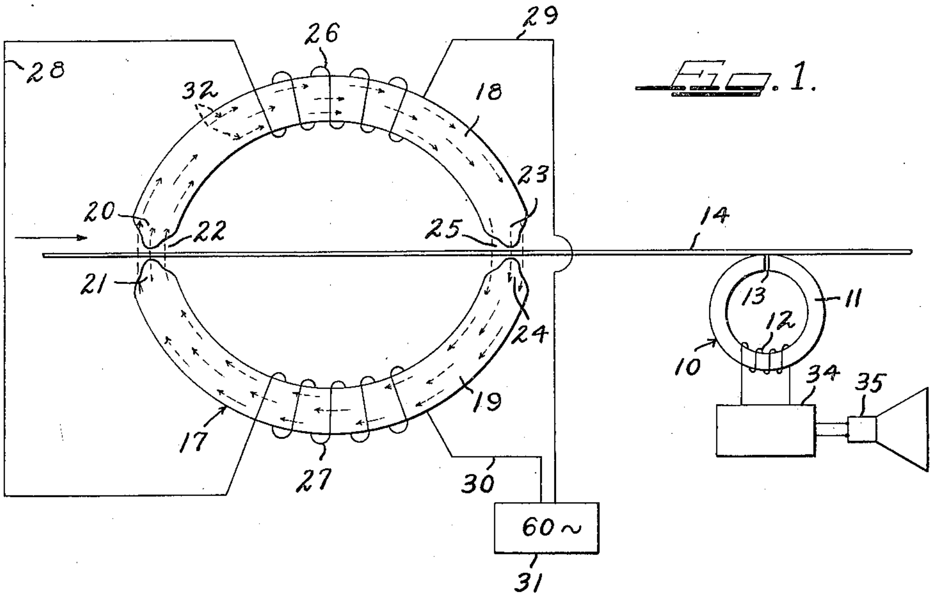

This invention relates to magnetic recording and reproducing apparatus, and more particularly, to a novel method and means for demagnetizing high coercive force materials.

One of the principal problems found in any magnetic recording technique is the conditioning of the magnetic record so as to remove all previous signals and to have it in a suitable condition so that a new magnetic record may be made thereon. It is well recognized that magnetic records which are completely demagnetized have many adherent advantages over those that are saturated in order to remove all prior made magnetic signals.

As is well recognized by those skilled in the art, there are many advantages inherent in using a magnetic record member having a very high coercive force. The radically improved results of the various types of magnetic recording and reproducing machines which have been developed in the past few years is attributable to the use of a magnetic record member having a coercive force in the neighborhood of 250 to 350 oersteds, as compared with record members previously used which rarely had a coercive force of over 120 oersteds.

With the development of certain materials and techniques, it has been found that still further improvement may be had with record members having a still higher coercive force, and indeed, having a coercive force of 500 or more oersteds. It has not been possible to reuse these record members of extremely high coercive force with any degree of satisfaction prior to the present invention in view of the fact that there has been no means previously provided for completely erasing a magnetic record member with such a high coercive force. This results in a relatively high background noise in the record member when it is re-recorded on.

One of the principal features and objects of the present invention is to provide a novel method and means for demagnetizing these extremely high coercive force materials so that they may be reused and replayed with the same high efficiency and absence of background noise as is possible with a virgin record.

A further object of the present invention is to provide an erasing head for magnetic recording and reproducing apparatus which is energized from a conventional source of alternating current, such, for example, as that supplied by the public utility companies in most communities, namely, a 60-cycle alternating current.

A further object of the present invention is to provide a novel demagnetizing head for magnetic recording apparatus in which substantially all of the flux generated is used to demagnetize the magnetic record member.

A still further object of the present invention is to provide a novel demagnetizing head for a magnetic recording machine in which the magnetic record member is caused to traverse a substantially closed loop magnetic circuit, the record member passing successively through diametrically located gaps in the magnetic loop.

Figure 2:
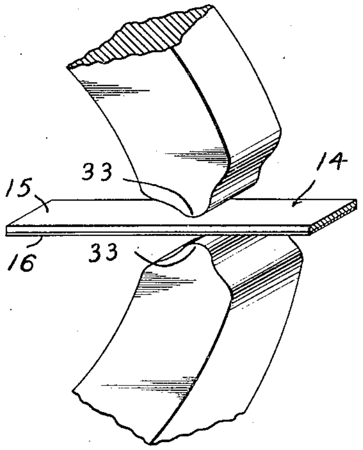

The novel features which I believe to be characteristic of my invention are set forth with particularity in the appended claims. My invention itself, however, both as to its organization, manner of construction and method of operation, together with further objects and advantages thereof may best be understood by reference to the following description taken in connection with the accompanying drawing, in which:

Figure 1 is a diagrammatic view of a magnetic recording machine including a demagnetizing head embodying the novel teachings and principles of the present invention; and Figure 2 is an enlarged fragmentary view of a portion of the core of a demagnetizing head adjacent one of the air gaps therein with a portion of the magnetic record member or tape passing therethrough.

Referring now to the drawing, the magnetic recording machine includes a recording head 10 having a C-shape core 11 and a signal coil 12. The core 11 has a gap 13 therein across which a traveling magnetizable record member 14 passes. The record member 14 may be of any suitable material or shape, and at least a portion of which is capable of being magnetized and has relatively high magnetic retentivity. By way of example, and not by way of limitation, the magnetic record member 14 may be in the form of a paper tape 15 having a coating 16 (see Figure 2) of powdered high coercive force material coated or otherwise bonded thereon or impregnated therein.

Before the magnetic record member 14 reaches the recording head 10, it is necessary to remove any previous magnetic record which may be on the record member 14 or which may be present due to the fact that the record has at some prior time been subjected to the influence of a magnetic field.

In accordance with the teachings of the present invention, the magnetic record member 14 is conditioned by first passing it through a demagnetizing head 17 which includes a pair of C-shape core pieces 18 and 19 having confronting poles 20 and 21, respectively, which are slightly spaced apart to provide one gap 22; and also provided with confronting pole portions 23 and 24, respectively which are slightly spaced apart to define a second gap 25. The C-shape core pieces 18 and 19 are located on opposite sides of the tape 14, and the tape 14 as may be seen from an inspection of Figure 1 of the drawing passes first through gap 22 and then through gap 25.

A coil 26 is wound on the core piece 18, and a second coil 27 is wound on the core piece 19. These two coils 26 and 27 are serially connected by means of conductors 28, 29 and 30 to a source of very low frequency alternating current 31 such, for example, as a source of 60-cycle alternating current. The coils 26 and 27 are wound in aiding relation to each other thus providing a flux path which is first in the direction as indicated by the arrows 32 and during the next half cycle of alternating current by a flux which flows in the opposite direction to that indicated by the arrows 32. Because there is a substantially closed iron path for the flux, it will be apparent that substantially all of the flux generated is used and that this flux is concentrated through a very narrow gap.

In order to still further concentrate the flux in the two gaps 22 and 25, the pole tips 20, 21, 23 and 24 are preferably tapered in a plane transverse to the surface of the tape and parallel to the direction of travel of the tape. The reduced edges 33 of the pole tips thus lie transverse to the direction of movement of the tape.

The tape, after being demagnetized in the manner described above, then passes over the recording head 10 where it is longitudinally magnetized by the fluctuating magnetic field set up in the gap 13. The fluctuating magnetic field is established by the coil 12 which is energized from an audio amplifier 34, which, in turn, is connected to a microphone or other source of signal energy 35.

By means of the arrangement described above, it is possible to get a great deal of energy into the demagnetizing device without overheating it, and it is also possible to get very good demagnetization of the high coercive force materials due to the relatively slow reversals in the magnetic field in the two gaps 22 and 25. It has also been found that the transverse demagnetization of the record member which is later to be longitudinally recorded on also is effective in helping to reduce any background noise in the record member when it is re-recorded on.

While I have shown a particular embodiment of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A head for demagnetizing a magnetic record member comprising a pair of confronting C-shape core members with corresponding ends of equal cross-sectional area in closely spaced relation to define a pair of gaps through which the record member is arranged to pass successively, an exciting coil on at least one of said core members and a low frequency alternating power supply circuit connected to said coil.

2. A head for demagnetizing a magnetic record member comprising a pair of confronting C-shape core members with corresponding ends of equal cross-sectional area in closely spaced relation to define a pair of gaps through which the record member is arranged to pass successively, the size of said gaps being only slightly greater than the thickness of the record member, an exciting coil on at least one of said core members, and a low frequency alternating power supply circuit connected to said coil, said pair of confronting C-shape core members forming substantially a closed magnetic path of low reluctance for the flux which first circulates around the substantially closed path in one direction and then in the other direction.

3. A head for demagnetizing a magnetic record member comprising a pair of confronting C-shape core members with corresponding ends of equal cross-sectional area in closely spaced relation to define a pair of gaps through which the record member is arranged to pass successively, a pair of exciting coils, one on each of said core members, a power supply circuit of low frequency alternating electric current, said coils being connected in series to said power supply circuit.

4. A head for demagnetizing a magnetic record member comprising a pair of confronting C-shape core members with corresponding ends of equal cross-sectional area in closely spaced relation to define a pair of gaps through which the record member is arranged to pass successively, a pair of exciting coils, one on each of said core members, a power supply circuit of low frequency alternating electric current, said coils being connected in series to said power supply circuit, said coils being wound on their respective core members in such direction so that the flux set up by one coil is in the same direction as the flux set up by the other coil at any given instant of time.

5. A head for demagnetizing a magnetic record member comprising a pair of confronting C-shape core members with corresponding ends of equal cross-sectional area in closely spaced relation to define a pair of gaps through which the record member is arranged to pass successively, an exciting coil on at least one of said core members and a source of alternating current connected to said coil.

6. A head for demagnetizing a magnetic record member comprising a pair of confronting C-shape core members with corresponding ends of equal cross-sectional area in closely spaced relation to define a pair of gaps through which the record member is arranged to pass successively, a pair of exciting coils, one on each of said core members, a source of alternating current, said coils being connected in series to said source of alternating current.

HUGH A. HOWELL.

REFERENCES CITED

The following references are of record in the file of this patent:

UNITED STATES PATENTS

| Number | Name | Date |
| --- | --- | --- |
| 1,303,397 | Rowand | May 13, 1919 |
| 1,303,398 | Rowand | May 13, 1919 |
| 1,414,170 | Bethke et al. | Apr. 25, 1922 |
| 2,216,600 | Moore | Oct. 1, 1940 |
| 2,281,862 | Weitmann et al. | July 7, 1942 |
| 2,305,659 | Arnold | Dec. 22, 1942 |
| 2,418,542 | Camras | Apr. 18, 1947 |